No. 869,138. PATENTED OCT. 22, 1907.
W. L. R. EMMET.
SYSTEM OF LUBRICATION FOR ELASTIC FLUID TURBINES.
APPLICATION FILED SEPT. 24, 1904.
2 SHEETS—SHEET 2.
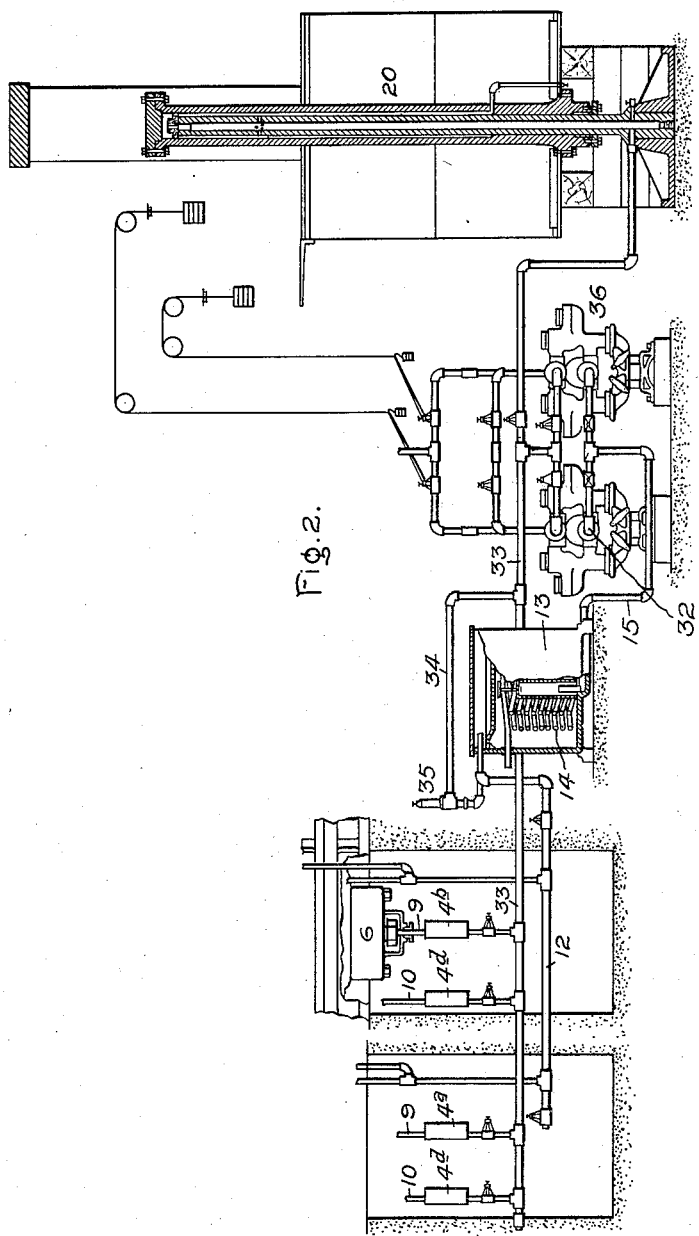
Witnesses.
Harry A. Tilden,
Alex F. Macdonald.
Inventor.
William L.R. Emmet.
by Albert G. Davis
Att'y.

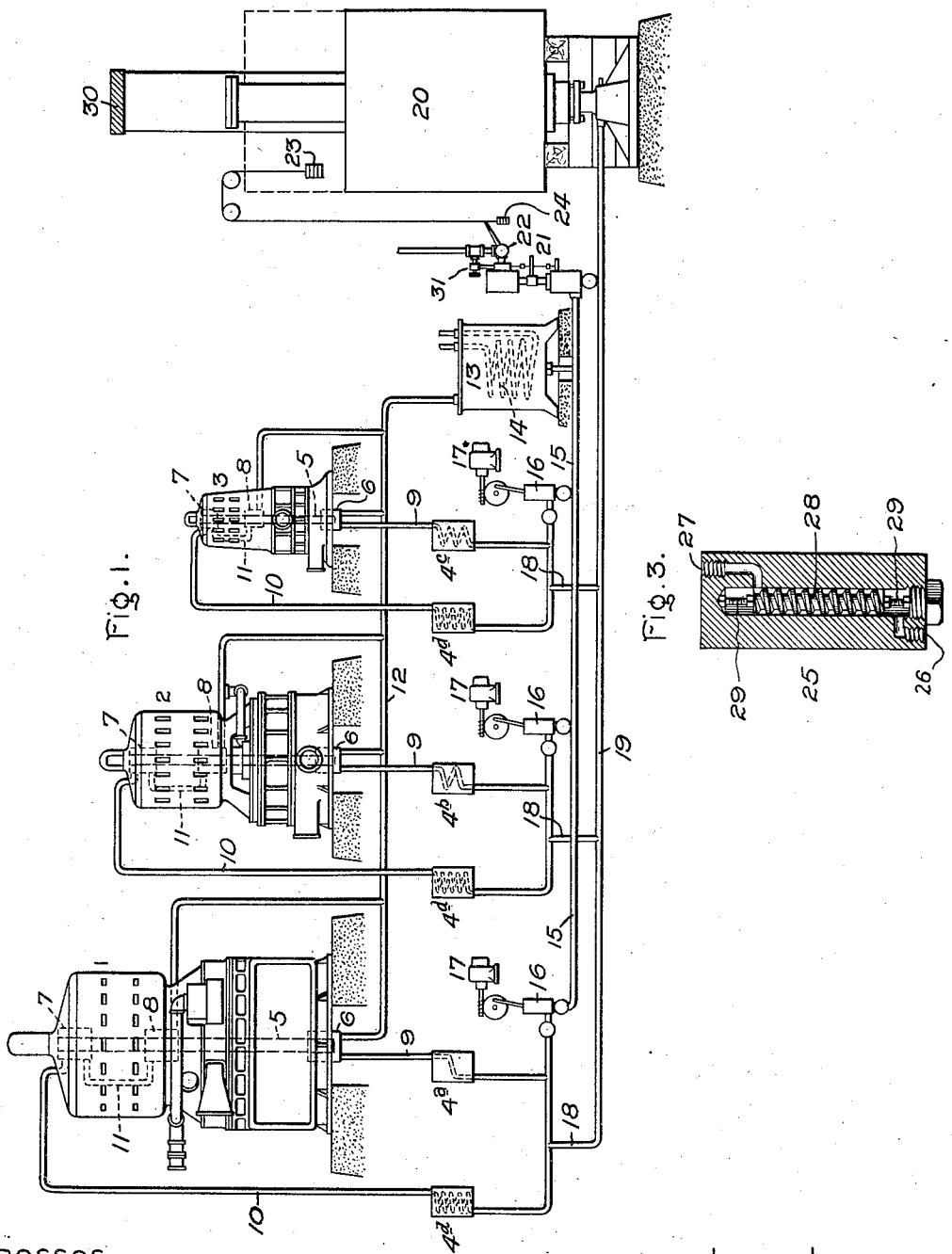

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SYSTEM OF LUBRICATION FOR ELASTIC-FLUID TURBINES.

869,138.      Specification of Letters Patent.      Patented Oct. 22, 1907.

Application filed September 24, 1904. Serial No. 225,744.

*To all whom it may concern:*

Be it known that I, WILLIAM L. R. EMMET, a citizen of the United States, residing at Schenectady, in the county of Schenectady and State of New York, have invented certain new and useful Improvements in Systems of Lubrication for Elastic-Fluid Turbines, of which the following is a specification.

This invention relates to the problem of properly lubricating the shaft-bearings of elastic-fluid turbine engines, and especially to those in which the shaft is vertical.

For the sake of brevity, I shall describe the invention as applied to an impact steam turbine of the vertical type, with the understanding that I am not restricted to that particular build of engine, but may use the invention wherever it is applicable to the forced lubrication of shaft bearings.

In an upright turbine, the weight of the rotating parts (shaft and bucket-wheels, and revolving element if an electric generator is included) is supported on a step-bearing, the shaft being steadied and kept in proper alinement by bolster or guide bearings at one or more points above. The step-bearing is preferably composed of two circular disks of cast-iron, one secured on the foot of the shaft and the other on a stationary portion of the engine frame. The disks are faced off to fit each other, and between them is formed a shallow central chamber into which oil, water or other lubricant is forced by a suitable means at a pressure sufficient to lift the shaft and its attached parts, so that the lubricant escapes between the disks, which are thus kept separated by a thin film of lubricant. The pressure necessary to thus float the revolving parts of the turbine is a function of the weight of these parts and the area of the bearing. In large machines the pressure may be as great as one thousand pounds to the square inch. The bolster or guide bearings, however, do not require any such pressure, as they sustain merely the lateral thrust of the shaft, which is very small, owing to the extremely accurate balancing of the rotating parts. A pressure but little more than is necessary to lift the lubricant to these bearings, is sufficient. The problem of supplying all the bearings with lubricant by means of a single forcing apparatus is thus rendered difficult, since the initial pressure must be high enough to feed the step-bearing, but must be greatly reduced in those pipes which feed the guide-bearings. Ordinary pressure-reducing devices, which depend for their operation upon throttling the flow of fluid and compelling it to pass a valve only slightly open, are found to be unsuitable owing to the rapidity with which the valves wear away and alter the ratio of pressures. It is of vital importance that nothing shall happen to rob the step-bearing of lubricant, for the successful operation of the engine depends upon the constant and equable lubrication of this bearing. But any change in the ratio of pressures in the step-bearing and guide-bearing pipes results in a loss of lubricant at the step-bearing and an excess at the guide-bearings. Hence the pressure-regulating devices must be extremely accurate and durable, in order to maintain an exact and constant ratio of pressures in the several parts of the system. The problem is further complicated when two or more turbines are lubricated by a single distributing system, and especially if they are of different sizes: the larger machines requiring a higher pressure and greater volume than the smaller ones. Thus the step-bearing of the 5000 kilowatt machine uses about four gallons per minute at a pressure of 1000 pounds to the square inch, while the 500 kilowatt machine uses half a gallon per minute at 300 pounds pressure.

Another matter essential to the successful operation of a turbine engine, or a battery of such engines, is the constancy of supply of the lubricant. As the system is a circulating one, a pump is required to keep the lubricant moving. Since a pump may break down, it becomes necessary to provide more than one, in order that there may always be a reserve of power.

My invention therefore consists in a system of forced lubrication for one or more turbine engines, in which the ratio or ratios of pressures are maintained constant, and a reserve of circulating devices is provided to meet emergencies.

As a pressure regulator, I use a baffler; that is to say, a device having a tortuous passage of practically uniform cross-section, so that the stream of lubricant is not throttled or wire-drawn at any point, but is retarded wholly by the increased friction occasioned by the frequent reversal of its direction of flow. By selecting the proper sizes of pipe, and using the proper number of turns in the bafflers, it is possible to deliver exact quantities of lubricant to all the bearings. For convenience, I use a baffler having a helical passage; but it is evident that other forms can be substituted if desired. The helical form, however, produces the greatest retarding effect in a given length of passage, owing to the constant change in direction. As a means of meeting emergencies due to breakdowns in the forcing apparatus, I provide a plurality of such devices all connected with the pipe-system and each available for use at any instant. I prefer to so connect them that if one in operation fails another will automatically start. Thus there may be an electric pump for each turbine, all feeding into the common pipe-system; an accumulator usually but not necessarily of the dead-weight type also connected with said system and kept full by said pumps, and serving to make up for the deficiency or failure of any one or more of them; and a steam pump which is automatically started when the accumulator is emptied. Or, the system may be normally supplied by a single pump, such as a steam pump, automatically controlled by an accumulator; a second steam pump being kept in reserve to start automatically when the accumulator is emptied. Other arrangements will be readily designed by the skilled engineer from the disclosures given.

In the accompanying drawings, Figure 1 is a diagrammatic representation of a system of lubrication embodying my improvements; Fig. 2 is a modification thereof; and Fig. 3 is a longitudinal section of one form of baffler.

The three vertical turbines 1 2 3 illustrate correctly the relative sizes of the 5000, 2000 and 500 kilowatt machines of the Curtis type. The other parts of the installation are necessarily shown out of proportion for the sake of clearness. Thus the total height of the 5000 kilowatt machine is actually twenty-five feet, while the bafflers $4^a$, $4^b$, etc., are not over one foot long.

Each turbine has a central upright shaft 5, supported at the bottom in a step-bearing 6 and guided by upper and middle guide-bearings 7 8. A pipe 9 supplies lubricant to the step-bearing, and a pipe 10 conveys lubricant to the upper bearing 7, whence it flows by a pipe 11 to the middle bearing 8. The lubricant which passes through the step-bearing and the middle bearing is led off through a pipe 12 to a cooler 13 in which is a coil of pipe 14 through which cold water circulates. The cooled lubricant runs from the cooler into a suction main 15 which feeds the circulating devices.

In Fig. 1 each turbine has its own individual pump 16, driven preferably by an electric motor 17. Each pump delivers into both the pipes 9 and 10 of its own turbine, and is also connected by a branch pipe 18 with a main 19 running to a dead-weight accumulator 20. Connected with the suction main 15 is a steam pump 21 which delivers into the accumulator main 19. The throttle valve 22 of the steam pump is held open by a weight 23 until the latter is lifted by the accumulator when it is full, thereby permitting a lighter weight 24 to close said throttle. The position of the accumulator when full is shown by dotted lines.

If the pumps were all connected as shown, without any pressure-regulating devices in circuit with them, the lubricant would all be forced to the guide bearings of the smallest turbine, and none would go to the step-bearing of that machine or to any of the bearings of the other machines or to the accumulator. In order to effect a proper distribution of the lubricant, I insert in each pipe 9 and 10 a baffler, preferably constructed as follows: A cylindrical chamber is made in a casing 25, with inlet and outlet ducts 26 27 near its respective ends. Into said chamber is introduced a plug 28 having a helical screw-thread on its exterior, which has a good fit in said chamber. Adjusting screws 29 enable the position of the plug to be altered lengthwise to cut some of the threads in or out and so vary the effective length of the helical passage connecting the inlet and outlet ducts. This specific construction of baffler is not a part of this invention, but is illustrated to assist in the understanding of the present application.

The bafflers $4^a$ $4^b$ $4^c$ have but a few turns, so that they offer only a low resistance to the flow of the lubricant to the step-bearings. The resistance of the baffler $4^a$ is the lowest, because the pressure in the step-bearing of the largest turbine must be the greatest. The excess of pressure below the baffler is just enough to cause the accumulator to fill up and remain arrested by its stop 30. The baffler $4^b$ has a little higher resistance than the baffler $4^a$, because the turbine 2 is smaller and requires less pressure in its step-bearing. For the same reason the baffler $4^c$ is of still higher resistance. All the bafflers $4^b$ have a large number of turns, so that their resistance is quite high and restrains the flow of lubricant to the guide-bearings, the delivery being properly regulated in the case of each machine by a proper adjustment of the baffler. It will therefore be seen that by means of the bafflers the pressure of the lubricant and consequently its flow in any part of the system can be regulated with great nicety, and that when once adjusted it will remain constant, owing to the fact that the conduit is nowhere contracted, and therefore no undue wear can take place at any one point. It is evident that the flow through each baffler will be inversely proportional to its resistance. The electric pumps are tied together by the accumulator main 19 and its branches 18, so that they all contribute to keep up a constant pressure. If any one of them has to be shut down for a short time, the accumulator begins to fall and make up the deficiency in the supply, the dead weight being sufficient to overcome the resistance of the bearings and the bafflers. The rate of fall of the accumulator is such as to give time for making minor repairs and adjustments of one of the electric pumps: say from fifteen to thirty minutes. Just before the accumulator becomes empty, it releases the weight 23 which starts the steam pump. This not only feeds the bearings, but pumps back into the accumulator until the latter is full again, and the steam pump stops. This alternate operation of the accumulator and the steam pump suffices to keep the lubricating system well supplied. If desired, the steam pump can be kept in operation continuously so long as desired, by opening a hand-valve 31 in a by-pass around the automatic throttle.

In the modification shown in Fig. 2, a single steam pump 32 is substituted for the several electric pumps shown in Fig. 1, delivering into a main 33 which is connected with all the pipes 9 and 10, and also with the accumulator. A by-pass branch 34 has a relief valve 35 which permits any excess of pressure to be conducted into the cooler. But this is hardly necessary as the step-bearings act as regulators, the shafts lifting a minute distance in case of excessive pressure and thus permitting a more rapid flow of lubricant through the bearings. The pump is shown as automatically controlled by the rise and fall of the accumulator. An emergency steam pump 36 is provided which comes into play when the accumulator falls below a predetermined point, which is lower than the point where the first pump usually begins to operate. The automatic action of both pumps is preferably effected by differential weights operating on the throttle valves through cords and pulleys, as shown.

In accordance with the provisions of the patent statutes I have described the principle of operation of my invention, together with the apparatus which I now consider to represent the best embodiment thereof, but I desire to have it understood that the apparatus shown is only illustrative, and that the invention can be carried out by other means.

What I claim as new and desire to secure by Letters Patent of the United States, is,

1. The combination in a system of forced lubrication, of a source of lubricant under pressure, conduits leading from the source to the members to be lubricated, bafflers in said conduits for regulating the pressure and the rate of flow of lubricant to the members, said bafflers containing a bent continuous passage of practically uniform area.

2. The combination in a system of forced lubrication, of a source of lubricant under pressure, a conduit leading from the source to the member to be lubricated, and a baffler in said conduit having a tortuous passage of practically uniform area for reducing the pressure and flow of the lubricant.

3. The combination with a system of forced lubrication of a baffler having a helical passage of practically uniform area for reducing the pressure and flow of the lubricant.

4. The combination in a system of forced lubrication, of a source of lubricant under pressure, conduits leading from the source to the members to be lubricated, two or more bafflers in said conduits having tortuous passages of different lengths for reducing the pressure and flow of the lubricant.

5. In a system of forced lubrication, the combination of a source of lubricant under pressure, a plurality of conduits leading from the source to the members to be lubricated, and bafflers in one or more of said conduits for reducing the pressure and flow of the lubricant therein.

6. In a system of forced lubrication having a plurality of conduits, the combination of a source of lubricant under pressure, and bafflers in one or more of said conduits which offer different resistances to the flow of the lubricant from the source.

7. In a system of forced lubrication, the combination of a plurality of conduits, a common source of supply for all of the conduits, and bafflers located in and controlling one or more of said conduits and offering resistances inversely proportional to the desired rate of flow in the respective conduits.

8. The combination with an apparatus having shaft bearings requiring a constant supply of lubricant, of a source of lubricant under pressure, conduits between the source and the bearings, and a pressure regulator for each bearing located in its supply conduit and comprising a tortuous passageway of practically uniform area.

9. The combination with an apparatus having shaft bearings requiring a constant supply of lubricant, of conduits connected with the bearings, means for forcing lubricant through the conduits, and a pressure regulator for each bearing located in its supply conduit and comprising a tortuous passageway of practically uniform area, the passageways in different regulators being of different lengths to effect different rates of flow to the bearings.

10. The combination with two or more pieces of apparatus having shaft bearings requiring constant but respectively different supplies of lubricant, of conduits connected with the bearings, means for forcing lubricant through said conduits, and a pressure regulator for each bearing located in its supply conduit and comprising a tortuous passageway of uniform area, the passageways in the several regulators offering different resistances to the flow.

11. The combination with a system of lubrication, of a power-driven pump for effecting the circulation of the lubricant, an accumulator connected with said system, and a reserve pump controlled by the movements of said accumulator.

12. The combination with a prime mover, of a system of piping supplying lubricant to the shaft-bearings, a power-driven pump connected with said piping, an accumulator connected with said piping on the delivery side of said pump, and a reserve pump arranged to deliver into said piping and accumulator.

13. The combination with two or more prime movers, of a system of pipes supplying lubricant to the shaft-bearings, a cooler receiving lubricant from said bearings, a power-driven pump taking lubricant from the cooler and delivering it to the supply pipes, an accumulator connected with said supply pipes, and a reserve pump also connected with said pipes.

14. The combination with two or more prime movers, of a system of pipes supplying lubricant to the shaft-bearings, a cooler receiving lubricant from the bearings, a separate power-driven pump for each prime-mover taking lubricant from the cooler and delivering it to the supply pipes, an accumulator connected with said supply pipes, and a reserve power-driven pump also connected with said pipes and automatically controlled by the rise and fall of said accumulator.

15. The combination with a prime mover, of a source of lubricant supply and a system of piping arranged to maintain a continuous flow of lubricant to the prime mover, and an accumulator connected to the system of piping and in multiple with the main source, the said accumulator normally containing a body of lubricant and arranged to feed it back into the piping system when the first source of supply fails.

In witness whereof, I have hereunto set my hand this 23rd day of September, 1904.

WILLIAM L. R. EMMET.

Witnesses:
BENJAMIN B. HULL.
HELEN ORFORD.